United States Patent

Schledjewski et al.

[11] Patent Number: 5,866,257
[45] Date of Patent: Feb. 2, 1999

[54] FLEXIBLE MULTILAYER FILM AND USE THEREOF

[75] Inventors: Ralf Schledjewski, Hodenhagen; Dirk Schultze, Düsseldorf, both of Germany; Nicole Hargarter, Charlottesville, Va.

[73] Assignee: Wolff Walsrode AG, Walsrode, Germany

[21] Appl. No.: 965,168

[22] Filed: Nov. 6, 1997

[30] Foreign Application Priority Data

Nov. 13, 1996 [DE] Germany ......................... 196 46 853.1

[51] Int. Cl.$^6$ ..................................................... B32B 27/00
[52] U.S. Cl. ..................................... 428/423.1; 428/424.2; 428/336; 428/339; 428/515; 525/74; 525/78; 525/80
[58] Field of Search ............................... 428/423.1, 424.2, 428/336, 339, 515; 525/74, 78, 80

[56] References Cited

U.S. PATENT DOCUMENTS 5,385,781  1/1995  Chundury et al. ..................... 428/330

Primary Examiner—Duc Truong
Attorney, Agent, or Firm—Sprung Kramer Schaefer & Briscoe

[57] ABSTRACT

The present invention relates to a multilayer film having at least one layer substantially formed from thermoplastic polyurethanes, and at least one further layer, formed from an olefin-based polymer coupling agent, which contains maleic anhydride as a formulation component and the Vicat softening temperature of which, measured to ASTM D 1525, is less than 60° C.

16 Claims, 1 Drawing Sheet

FLEXIBLE MULTILAYER FILM AND USE THEREOF

This invention relates to elastic thermoplastic films having at least two layers, which films consist of at least one layer of thermoplastic polyurethane and at least one further layer, which is formed from a coupling agent having a low Vicat softening temperature.

BACKGROUND OF THE INVENTION

The combination of urethane polymer and coupling agent yields a flexible film having a good range of mechanical properties and very good water vapour barrier action.

Flexible films having good mechanical properties are required for the production of flexible containers for gaseous or liquid media, such as for example water beds. It is known that plasticised PVC may be used for such applications. Due to the particular properties of PVC, relatively large quantities of material must be used in such cases.

Monolayer films of thermoplastic polyurethane (TPU), processes for the production thereof and use thereof are known from the prior art, for example from EP 0 308 683, EP 0 526 858, EP 0 571 868 or EP 0 603 680. The structures described in these documents may be incorporated as the higher-melting layer or layers in laminating films or have already been incorporated into laminating films of a known type. The production of TPU films using substantially incompatible polymers as flatting agents in TPU elastomers has also been described, for example in DE 41 26 499.

It is furthermore known that a considerable improvement in the adhesion properties of a homo-, co- or terpolymer may be achieved by adding a low molecular weight resin of a non-waxy nature, whether of natural or synthetic origin. Such resins are described, for example, in *Ullmanns Encyklopädie der technischen Chemie*, volume 12, $4^{th}$ edition, Verlag Chemie, Weinheim 1976, pp. 525–555. Such resins conventionally have an average molecular weight of below 2000 g/mol. The resins, both those which are solid and those which are liquid at room temperature, are not usually crystallisable and accordingly do not have a well defined melting point. The materials taken to be included among low molecular weight resins do, however, have a softening temperature which may be determined using the ball and ring method according to ASTM E-28 or DIN 1995. These resins may reduce melt viscosity, so possibly rendering melt homogeneity distinctly more uniform. Due to the improvement in flow properties brought about by addition of the low molecular weight resins, films having outer layers of already flexible co- or terpolymers exhibit the disadvantage of having very smooth surfaces, so giving the films a tendency to block.

The object thus arose of providing a flexible film having a good range of mechanical properties, superior to that of plasticised PVC, combined with elevated impermeability to water vapour. In order to minimise production costs, it should be possible to achieve the combination of properties in a single stage process.

SUMMARY OF THE INVENTION

It has proved possible according to the invention to provide a film which fulfils the stated requirements, which is characterised in that the film consists of at least two layers (c.f. FIG. 1), wherein at least one layer consists of a thermoplastic polyurethane (1). The film moreover comprises at least one further layer (2), which is formed from an olefin-based polymeric coupling agent, which contains maleic anhydride as one formulation component and the Vicat softening temperature of which, measured to ASTM D 1525, is less than 60° C. The layer arrangement corresponds to that of the attached FIG. 1 of the multilayer film according to the invention.

DETAILED DESCRIPTION OF THE DRAWINGS

DETAILED DESCRIPTION OF THE INVENTION

Figure 1:
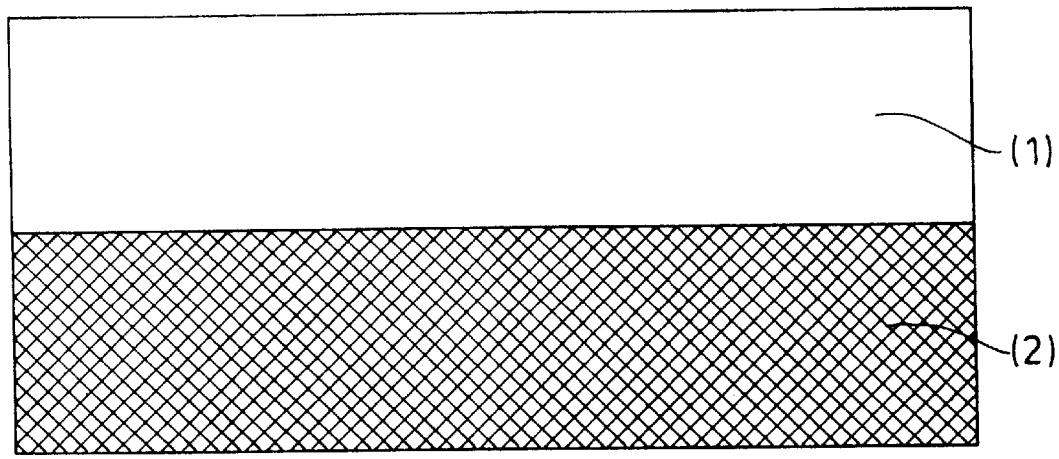
FIG. 1 shows a film according to the invention having two layers.

According to the invention, preferred coupling agents in layer (2) are those which are characterised in that the Vicat softening temperature of the coupling agent component, measured to ASTM D 1525, is at temperatures of less than 50° C.

Copolymers of ethylene with maleic anhydride and esters of α,β-monounsaturated alcohols or carboxylic acids are preferably also suitable for the production of the coupling agent layer (2). These in particular comprise copolymers prepared from ethylene and acrylic acid esters, methacrylic acid esters or vinyl acetate.

In a particularly preferred embodiment, coupling agents are used in layer (2) which are characterised in that they are synthesised at least from the comonomers ethylene and maleic anhydride, wherein the proportion of maleic anhydride in the total weight of the coupling substance used for film production is less than 6 wt. %.

According to the invention, in order to achieve the low Vicat softening temperature, coupling components are preferably used which contain chloroform-extractable low molecular weight resins as a component of the formulation.

Preferred chloroform-extractable, low molecular weight resins are those which improve the adhesive properties of the coupling component in such a manner that very good interlayer adhesion is achieved. Addition of the resin also modifies the phase behaviour of the coupling agent component. The softening temperature is reduced, so improving elasticity and flexibility.

Low molecular weight resins suitable for the purposes of the invention may originate, for example, from the class of natural resins, such as for example asphaltites, balsams, pine balsams, recent resins, fossil resins, rosin, rosin derivatives or shellac, and/or from the class of synthetic resins, such as for example aliphatic or aromatic hydrocarbon resins, partially or completely hydrogenated hydrocarbon resins, modified hydrocarbon resins, indene/coumarone resins, furan resins, ketone resins as well as polyamide resins. Low molecular weight resins are offered for sale, for example, under the trade names Escorez® or Fural®.

Preferred resins are those having a softening point of less than 100° C., measured to ASTM E-28 or DIN 1995 with a ball and ring.

Coupling agents suitable according to the invention may be based on maleic acid modified waxy ethylene polymers. To this end, ethylene is polymerised in the presence of hydrogen, then oxidised and modified with maleic acid. Such waxes are characterised by a softening range of less than 150° C., measured to ASTM E-28 or DIN 1995 with a ball and ring.

Layer (1) of the multilayer film according to the invention is produced from at least one thermoplastic polyurethane elastomer, preferably from a predominantly linear thermoplastic polyurethane elastomer, the relatively long chain diol component of which is a polyester or polyether, and which has a Shore hardness of preferably 75 to 95 A, particularly preferably of 85 to 95 A, determined to DIN 53 505.

Suitable thermoplastic polyurethanes are obtainable, for example, under the trade names Desmopan®, Elastollan®, Estane®, Morthane® or Texin®.

A suitable embodiment of the films according to the invention additionally contains, in the layer (1) formed from thermoplastic polyurethanes, conventional additives selected from the group comprising.

I. anti-blocking agents, inorganic or organic spacers,
II. lubricants or mould release agents,
III. pigments or fillers and
IV. stabilisers.

The proportion of the stated additives I to IV is in total preferably between 0% and 30%.

Conventional additives which may be present in the films according to the invention are described, for example, by Gächter & Müller in, *Kunststoff-Additive*, Carl Hanser Verlag, Munich, 3$^{rd}$ edition (1989).

Figure 2:
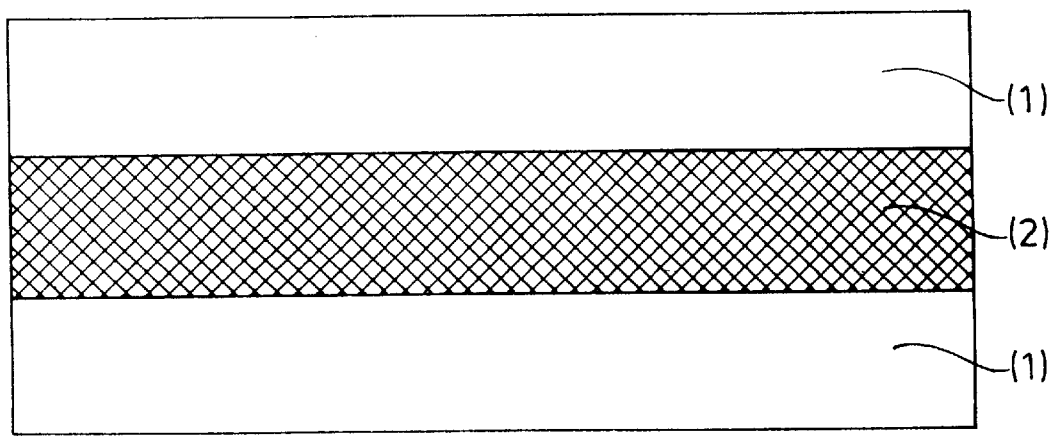
FIG. 2 shows a film according to the present invention having 3 layers.

A particularly preferred embodiment of the film according to the invention comprises a multilayer film of at least three layers (c.f. FIG. 2), characterised in that the layer containing the coupling agent (2) is at least between two layers produced from thermoplastic polyurethane (1).

According to the invention, preferred films have a total thickness of between 50 μm and 600 μm.

The thickness of the thermoplastic polyurethane layer (1) in such a film is preferably between 20 μm and 400 μm and the thickness of the coupling agent layer (2) preferably between 10 μm and 200 μm.

The usual thermal shaping processes for converting plastics into multilayer sheets are in particular suitable for the production of the multilayer film according to the invention. Production by coextrusion, preferably using the film blowing process, may here be mentioned. Of the suitable production processes for multilayer thermoplastic sheet, coextrusion is particularly preferred due to the better interlayer adhesion which may be achieved.

The surface properties of the films according to the invention may be modified on one or both sides using known physical and chemical treatment methods, such as for example corona treatment.

The film according to the invention is suitable for the production of containers, wherein the contents may be both of a liquid and gaseous nature. Such containers are in particular suitable for holding water. The containers are produced using familiar joining methods, such as for example high frequency welding.

It is particularly preferred according to the invention to use the film for the production of water beds or heating/cooling pads.

The films described in the following Examples and Comparative Example were produced by blown film coextrusion. The structure of screw compounders suitable for plasticising thermoplastic resins is described, for example, by Wortberg, Mahlke & Effen in *Kunststoffe*, 84 (1994) 1131–1138, by Pearson in *Mechanics of Polymer Processing*, Elsevier Publishers, New York, 1985 or by the company Davis-Standard in *Paper, Film & Foil Converter* 64 (1990), pp. 84–90. Dies for shaping the melt into films are explained inter alia by Michaeli in Extrusions-Werkzeuge, Hanser Verlag, Munich, 1991.

EXAMPLE 1

Using a two-layer blown film die, a film was produced, layer (1) of which was formed from an ether-TPU of a Shore A hardness of 87, measured to DIN 53 505, corresponding to a Shore D hardness of 36. 4% of spacers and 1% of waxes were added as additives to this layer of a thickness of 50 μm. All the components used for this layer were plasticised together in an extruder.

The 50 μm layer (2) was produced from a coupling component. The coupling component used was a copolymer of ethylene and maleic anhydride having a maleic anhydride content of below 5 wt. %. The MFI was between 3.3 and 3.5 g/10 min, measured to DIN 53 735 at 190° C. with a test load of 2.16 kg. Density was 0.88 g/cm$^3$. Due to the presence of a chloroform-extractable formulation component of a low molecular weight hydrocarbon resin, the Vicat softening temperature of the coupling agent used was below 40° C., measured to ASTM D 1525. The hardness of this component used to prepare the coupling layer was approx. 67 Shore A, measured to DIN 53 505, corresponding to approx. 15 Shore D.

The extrusion apparatus was operated at temperatures of between 160° C. and 200° C. The two melt streams were superposed in a two-layer blown film die at an operating temperature of 195° C. and discharged through an annular die of a diameter of 130 mm. The annular melt web was cooled by blowing with air, then collapsed, separated and wound.

EXAMPLE 2

Using a three-layer blown film die, a film was produced, the 100 μm coupling agent layer (2) of which was covered on each side with a 50 μm layer (1) of thermoplastic polyurethane. The raw materials used for the coupling agent layer (2) and thermoplastic polyurethane layers (1) were similar to those selected in Example 1.

The extrusion apparatus was operated at temperatures of between 160° C. and 200° C. The three melt streams were superposed in a three-layer blown film die at an operating temperature of 195° C. and discharged through an annular die of a diameter of 130 mm. The annular melt web was cooled by blowing with air, then collapsed, separated and wound.

EXAMPLE 3

A three-layer film similar to the structure described in Example 2 was produced.

The coupling component had an MFI of 1.3 g/10 min, measured to DIN 53 735 at 190° C. and a test load of 2.16 kg. This coupling component was synthesised from the monomers ethylene, vinyl acetate and maleic anhydride. Its melting point was 70° C., the Vicat softening temperature, measured to ASTM D 1525 was 52° C. Its density was 0.93 g/cm$^3$.

Comparative Example 1

A three-layer film similar to the structure described in Example 2 was produced.

The TPU used was the same mixture as in Example 1.

The coupling agent layer (2) was formed from an ethylene copolymer having a comonomer content of 19 wt. %. The comonomers used were butyl acrylate and maleic anhydride. The MFI of the coupling agent was 5.0 g/10 min, measured to DIN 53 735 at 190° C. and a test load of 2.16 kg. The melting point was 95° C., the Vicat softening point 63° C., measured to ASTM D 1525 and density was 0.94 g/cm$^3$.

Evaluation of the Films Produced in the Examples and Comparative Example

The interlayer adhesion and water vapour permeability of the specimens produced in the Examples and Comparative Example were tested. Interlayer adhesion was determined to DIN 53 357, method B. Interlayer adhesion is taken to be the maximum force necessary in order to delaminate the film to be tested from a test strip of 15 mm in width for a length of 10 mm at a separation angle of 90°. The rate of removal in this test is 100 mm/min. Water vapour permeability was determined to DIN 53 122 at 23° C. and 85% relative humidity.

The following Table shows characteristic data for the films produced in the Examples and Comparative Example. These clearly demonstrate the advantages of the films according to the invention described in the Examples over the films presented in the Comparative Example.

It is clearly evident from Table 1 that the multilayer film structures according to the invention presented in the Examples using coupling agents having low Vicat softening temperatures, which according to the invention are below 60° C., are superior with regard to the significant parameter of interlayer adhesion to the structure, also a multilayer structure, presented in the Comparative Example. The film according to the Comparative Example was produced using a coupling agent having a higher softening temperature.

Table 1 moreover proves that the water vapour barrier action of the coupling agent is at its most effective in the particularly preferred embodiments of the multilayer films in which the Vicat softening temperature of the coupling agents used is below 50° C.

TABLE 1

Properties of the films produced in
the Examples and Comparative Example

| Property | Test method | Unit | Example 1 | Example 2 | Example 3 | Comparative Example 1 |
|---|---|---|---|---|---|---|
| Interlayer adhesion | DIN 53 357 | N/15 mm | >10 | >10 | 8.2 | 0.3 |
| Water vapour permeability* | DIN 53 122 | g/m² · d | 7 | 6 | 16 | 14 |
| Vicat softening point of the coupling component | ASTM D 1525 | °C. | <40 | <40 | 52 | 63 |

*: Converted to a film thickness of 200 μm.

We claim:

1. Multilayer film having at least one layer substantially formed from thermoplastic polyurethanes and at least one further layer formed from an olefin-based polymer coupling agent, which contains maleic anhydride as a formulation component and the Vicat softening temperature of which, measured to ASTM D 1525, is less than 60° C.

2. Film according to claim 1, wherein the coupling agent layer is covered on both sides by at least one layer of thermoplastic polyurethane.

3. Film according to claim 1, wherein the Vicat softening range of the coupling agent component, measured to ASTM D 1525, is at temperatures of less than 50° C.

4. Film according to claim 1, wherein the proportion of maleic anhydride used as a formulation component to synthesise the coupling substance in the total weight of the coupling substance used for film production is less than 6 wt. %.

5. Film according to claim 1, wherein the materials used as coupling agents contain chloroform-extractable low molecular weight resins as additional components.

6. Film according to claim 1, wherein conventional additives selected from the group consisting of:

I. anti-blocking agents, inorganic or organic spacers,

II. lubricants or mould release agents,

III. pigments or fillers and

IV. stabilisers are added to the layers formed from thermoplastic polyurethanes, wherein the proportion of the stated additives I to IV is in total between 0% and 30%.

7. Film according to claim 1, wherein the film has a total thickness of between 50 μm and 600 μm, wherein the thickness of the layer(s) of thermoplastic polyurethanes is between 20 μm and 400 μm and the thickness of the coupling agent layer is between 10 μm and 200 μm.

8. Film according to claim 1, wherein the film was produced using a coextrusion process.

9. Film according to claim 8, wherein the film was produced using blown film coextrusion.

10. Film according to claim 1, wherein at least one of the outer layers has been subjected to a prior art physical and/or chemical surface treatment.

11. Film is according to claim 1, wherein the film is used for the production of containers.

12. Film according to claim 11, wherein the film is converted into a sealed container by means of usual joining methods.

13. Film according to claim 1, wherein the olefin of the olefin coupling agent is ethylene.

14. Film according to claim 1, wherein the olefin based polymer of the coupling agent is further copolymerized with esters of α,β-monounsaturated alcohols or carboxylic acids.

15. Film according to claim 14, wherein the α,β-monounsaturated alcohols or carboxylic acids comprise at least one of acrylic acid esters, methacrylic acid esters or vinyl acetate.

16. Film according to claim 11, wherein the containers are water beds or heating/cooling pods.

* * * * *